United States Patent
Barnes et al.

(10) Patent No.: US 7,912,101 B2
(45) Date of Patent: Mar. 22, 2011

(54) CONTROLLING SECOND HARMONIC EFFICIENCY OF LASER BEAM INTERACTIONS

(75) Inventors: Norman P. Barnes, Yorktown, VA (US); Brian M. Walsh, Poquoson, VA (US); Donald J. Reichle, Seaford, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/628,423

(22) Filed: Dec. 1, 2009

(65) Prior Publication Data
US 2010/0135344 A1 Jun. 3, 2010

Related U.S. Application Data

(60) Provisional application No. 61/119,042, filed on Dec. 2, 2008.

(51) Int. Cl.
*H01S 3/10* (2006.01)
*H01S 3/08* (2006.01)

(52) U.S. Cl. .............................. 372/22; 372/21; 372/101
(58) Field of Classification Search .................... 327/21, 327/22, 27, 101
See application file for complete search history.

*Primary Examiner* — Armando Rodriguez
(74) *Attorney, Agent, or Firm* — Andrea Z. Warmbier; Helen M. Galus

(57) ABSTRACT

A method is provided for controlling second harmonic efficiency of laser beam interactions. A laser system generates two laser beams (e.g., a laser beam with two polarizations) for incidence on a nonlinear crystal having a preferred direction of propagation. Prior to incidence on the crystal, the beams are optically processed based on the crystal's beam separation characteristics to thereby control a position in the crystal along the preferred direction of propagation at which the beams interact.

12 Claims, 1 Drawing Sheet

CONTROLLING SECOND HARMONIC EFFICIENCY OF LASER BEAM INTERACTIONS

Pursuant to 35 U.S.C. §119, the benefit of priority from provisional application No. 61/119,042, with a filing date of Dec. 2, 2008, is claimed for this non-provisional application.

ORIGIN OF THE INVENTION

The invention was made employees of the United States Government and may be manufactured and used by or for the Government of the United States of America for governmental purposes without the payment of any royalties thereon or therefor.

BACKGROUND OF THE INVENTION

1. Field of the Invention

This invention relates to pulsed or continuous lasers employing second harmonic generation, sum frequency generation, or difference frequency generation. More specifically, the invention is a method for controlling/optimizing the efficiency of a laser that employs second harmonic generation.

2. Description of the Related Art

Pulsed and/or continuous lasers at a variety of specific wavelengths are known and commercially available. Nonlinear interactions between available laser beams are commonly used to generate laser beams at wavelengths for which no laser is available. Briefly, nonlinear optics are used in conjunction with a commercially-available laser(s) to generate laser frequencies at the sum and difference frequencies of the laser beams input to the nonlinear optics. A special case of sum frequency generation is known as Type II second harmonic generation in which the nonlinear optics receive an input beam with two polarizations. In other words, the input beam is essentially two input beams that have the same frequency and direction of propagation, but different polarizations. The nonlinear optics cause the two input beams to interact in a volumetric fashion to generate an output laser source at the sum frequency that is twice the laser frequency.

A performance metric of such second harmonic generation laser systems is the conversion efficiency of the nonlinear interactions that is often limited by the spatial and/or temporal separation of the two beams that are input to nonlinear optics. For efficient conversion, the laser beams associated with each polarization and interacting in the nonlinear optics must overlap both spatially and temporally. Pulsed laser beams that are completely overlapping when they enter the nonlinear optics can separate temporally (in the nonlinear optics medium/element) because the group velocities of the two beams are different. Pulsed or continuous laser beams that were initially completely overlapping could also (or alternatively) separate spatially because the direction of the group velocities of the two beams are different. Further, as the optical length of the nonlinear optical medium/element (e.g., a nonlinear crystal) increases, so does the temporal and/or spatial separation. Accordingly, these attributes limit the useful length of the nonlinear optical medium/element that can contribute to the conversion efficiency. Because efficiency often depends on the useful length of the nonlinear optics squared, attributes that limit the overlap of the interacting beams also severely limit the conversion efficiency.

Currently, nonlinear devices employing Type II second harmonic generation rely on the input beams of laser pulses being completely overlapped when input to (or incident on) the nonlinear optical medium/element. This happens naturally in cases where both input beams of laser pulses are generated by the same source, e.g., as is the case in Type II second harmonic generation. However, the two beams begin to separate as they travel through the nonlinear optics. Nonlinear optics that limit interactions to a short optical path degrade the conversion efficiency. For nonlinear optics with a longer optical path length, the two laser beams can completely separate thereby causing all conversion to cease. While lateral spatial separation can be mitigated to some degree by employing a pair of opposing nonlinear crystals (e.g., each half as long as the desired length), this approach introduces phase control problems of the second harmonic as the laser beams travel between the pair of nonlinear crystals.

SUMMARY OF THE INVENTION

Accordingly, it is an object of the present invention to provide a method of controlling second harmonic efficiency of laser beam interactions.

Another object of the present invention is to provide a method of optimizing second harmonic efficiency of laser beam interactions.

Other objects and advantages of the present invention will become more obvious hereinafter in the specification and drawings.

In accordance with the present invention, a method is provided for controlling second harmonic efficiency of laser beam interactions. A laser system includes at least one source for generating two laser beams (e.g., a laser beam with two polarizations) for incidence on a nonlinear crystal having a preferred direction of propagation. The crystal can introduce laser beam separation having at least one of spatial and temporal characteristics. Prior to incidence on the crystal, the laser beam with two polarizations is optically processed based on the separation so-introduced by the crystal to thereby control a position in the crystal along the preferred direction of propagation at which the two polarizations interact in a volumetric fashion.

The above features and advantages and other features and advantages of the present invention are readily apparent from the following detailed description of advantageous modes for carrying out the invention when described in connection with the accompanying drawings.

DETAILED DESCRIPTION OF THE INVENTION

Figure 1:
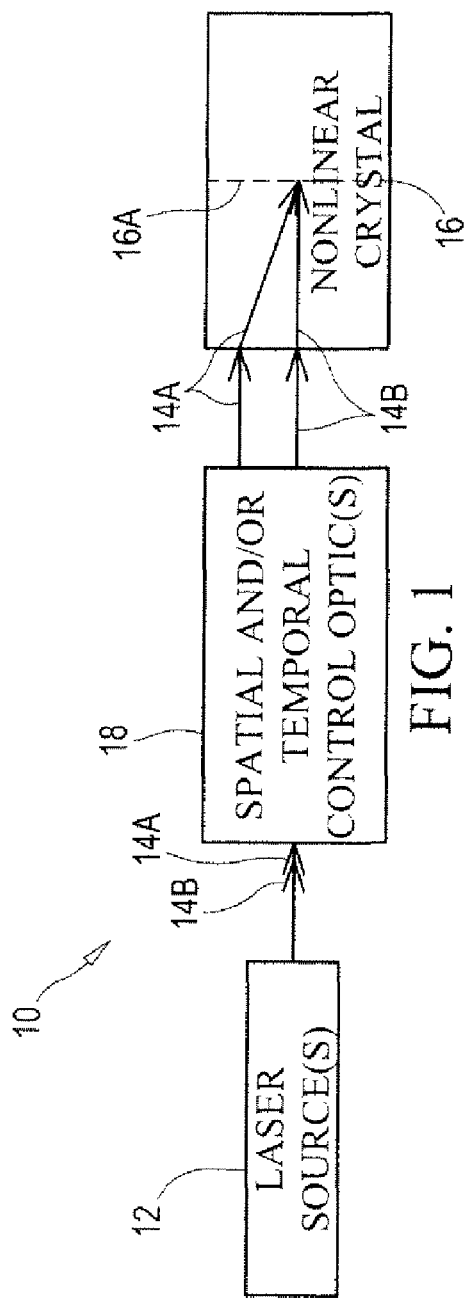
FIG. 1 is a block diagram of a laser system for controlling second harmonic conversion efficiency thereof in accordance with at least one embodiment of the present invention.

Referring now to the drawings and more particularly to FIG. 1, a laser system having a controllable second harmonic conversion efficiency in accordance with an embodiment of the present invention is shown and is referenced generally by numeral 10. Second harmonic conversion efficiency is of concern for pulsed lasers such as mode locked lasers or Q-switched lasers employing Type II interactions where both temporal and spatial (e.g., lateral) beam separation effects limit the overlapping volume of the interacting laser pulses. However, it is to be understood that the approach used in the present invention also applies to second harmonic conversion efficiency of continuous laser systems where beams experience just spatial separation.

By way of example, laser system 10 will be described for a pulsed laser system and will typically include one or more laser sources 12 capable of generating a beam of laser pulses with two polarizations such that the beam can be thought of as two overlapping beams. In the illustration, the overlapping beams are designated by overlapping arrows 14A and 14B. As is known in the art of second harmonic generation, a nonlinear crystal 16 is provided to receive and optically process beams 14A and 14B, i.e., cause nonlinear interactions between beams 14A and 14B as they pass through nonlinear crystal 16. More specifically, nonlinear crystal 16 is positioned and oriented to define a direction of propagation for beams incident on the crystal. Any non-linear crystal will inherently cause some amount of spatial and/or temporal separation to occur between two beams incident on the crystal.

In accordance with the present invention, one or more spatial and/or temporal control optics 18 are disposed between beams 14A/14B (as generated by source 12) and nonlinear crystal 16. Generally speaking, control optics 18 are designed to counteract the spatial and/or temporal separation caused by nonlinear crystal 16 to thereby control the position in nonlinear crystal 16 at which beams 14A and 14B most strongly volumetrically interact or overlap for optimal efficiency. That is, control optics 18 cause the incoming beams 14A and 14B to be laterally and/or temporally displaced in a manner that compensates for the separation that will be caused by nonlinear crystal 16. For example, assume nonlinear crystal 16 caused incident overlapping beams to separate with one beam (e.g., beam 14B) going straight and the other beam (e.g., beam 14A) translating to the right. To counteract this, control optics 18 in the illustrated example could be realized with a birefringent optical element that caused just the right-translating beam to translate to the left such that beams 14A and 14B experience spatial separation prior to being incident on nonlinear crystal 16 as shown in FIG. 1. Thus, in this example, when nonlinear crystal 16 then causes beam 14A to translate to the right, beam 14A will interact with beam 14B in nonlinear crystal 16.

Figure 2:
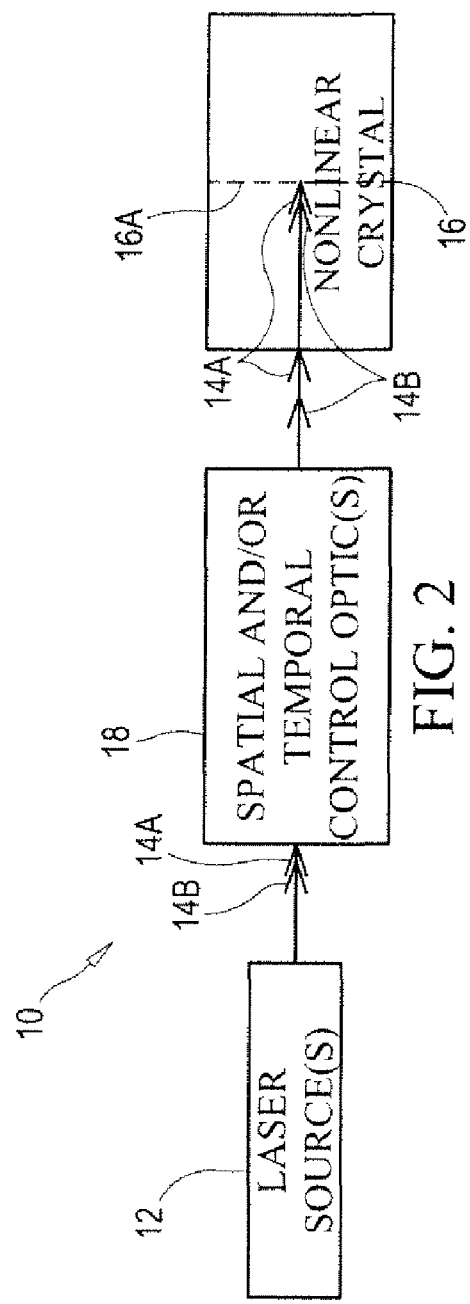
FIG. 2 is a block diagram of a laser system for controlling second harmonic conversion efficiency thereof in accordance with at least another embodiment of the present invention.

A similar approach could be used when nonlinear crystal 16 introduces temporal separation. For example and with reference to FIG. 2, assume that nonlinear crystal 16 caused incident beams to propagate therethrough at different speeds. In this case, control optics 18 can be designed to counteract the speed differential introduced by nonlinear crystal 16. In the illustrated example, control optics 18 slows the pulses associated with beam 14B relative to those of beam 14A where the results of such slowing are indicated by the use of separated arrowheads. The slowing of beam 14B is performed to compensate/counteract the fact that nonlinear crystal 16 causes beam 14A to slow down as the pulses pass therethrough so that the pulses in beam 14B catch up to those in beam 14A as the beams pass through nonlinear crystal 16.

By controlling the position of beam interaction within nonlinear crystal 16, the present invention controls the conversion efficiency of second harmonic generation. To maximize the conversion efficiency, control optics 18 should advantageously be designed to position volumetric beam interaction at approximately the center of nonlinear crystal 16 where the center of nonlinear crystal 16 is designated by dashed line 16A. As used herein, "center 16A" refers to a midpoint of nonlinear crystal 16 along the direction of propagation defined by the orientation of crystal 16 in the laser system.

Control optics 18 can be one or more optical elements selected to counteract the separation introduced by the particular nonlinear crystal 16. For simplicity, cost concerns, and system reliability, the optical element(s) used for control optics 18 can be one or more passive optical elements. For the examples illustrated in FIGS. 1 and 2, control optics 18 counteracts just spatial or temporal separation characteristics of a nonlinear crystal. However, the present invention is not so limited as control optics 18 could also be designed to simultaneously counteract both spatial and temporal characteristics of a nonlinear crystal if the nonlinear crystal introduced both types of separation.

The advantages of the present invention are numerous. Second harmonic conversion efficiency in lasers is controlled/optimized by placing optics between a laser system's source and nonlinear crystal. The approach described herein can be readily adapted to a variety of second harmonic generation-based lasers. The present invention can be applied to both new and existing laser systems.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

The invention claimed is:

1. A method of controlling second harmonic efficiency of a laser beam interactions, comprising the steps of:
   providing a laser system that includes at least one source for generating a laser beam with two polarizations for incidence on a nonlinear crystal having a preferred direction of propagation, wherein the crystal can introduce laser beam separation having at least one of spatial and temporal characteristics; and
   optically processing the laser beam with two polarizations prior to incidence thereof on the crystal based on the separation so-introduced by the crystal for controlling a position in the crystal along the preferred direction of propagation at which the two polarizations volumetrically interact.

2. A method according to claim 1, wherein the position is located approximately at the center of the crystal in terms of the preferred direction of propagation.

3. A method according to claim 1, wherein said step of optically processing comprises the step of passive optical processing.

4. A method according to claim 1, wherein said step of optically processing comprises the step of positioning at least one optical element between the source and the crystal.

5. A method according to claim 4, wherein each optical element is a passive element.

6. A method of controlling second harmonic efficiency of laser system that employs second harmonic generation and that includes at least one source for generating two laser beams for incidence on a nonlinear crystal having a preferred direction of propagation, wherein the crystal can introduce separation between the two beams with the separation having at least one of spatial and temporal characteristics, said method comprising the step of controlling the two beams prior to their incidence on the crystal to counteract the separation so-introduced by the crystal wherein volumetric interaction of the two beams in the crystal is controlled in terms of position along the preferred direction of propagation.

7. A method according to claim 6, wherein said step of controlling causes the position to be located at approximately the center of the crystal in terms of the preferred direction of propagation.

8. A method according to claim 6, wherein said step of controlling is accomplished with at least one optical element.

9. A method according to claim 6, wherein said step of controlling is accomplished with at least one passive optical element.

10. A method of controlling second harmonic efficiency of a laser system that employs second harmonic generation and that includes at least one source for generating two laser beams for incidence on a nonlinear crystal having a preferred direction of propagation, wherein the crystal can introduce separation between the two beams with the separation having at least one of spatial and temporal characteristics, said method comprising the step of positioning at least one optical element between the source and the crystal to control volumetric interaction of the two beams in the crystal in terms of position thereof along the preferred direction of propagation.

11. A method according to claim 10, wherein the position of said volumetric interaction is located at approximately the center of the crystal in terms of the preferred direction of propagation.

12. A method according to claim 10, wherein each optical element is a passive optical element.

* * * * *